(12) United States Patent
Tanaka et al.

(10) Patent No.: US 8,576,417 B2
(45) Date of Patent: Nov. 5, 2013

(54) IMAGE-FORMING APPARATUS

(75) Inventors: Satoshi Tanaka, Kanagawa (JP);
Matsuyuki Aoki, Kanagawa (JP);
Makoto Hamatsu, Kanagawa (JP); Gen Nakajima, Kanagawa (JP); Yoshiki Matsuzaki, Kanagawa (JP); Shun Yashima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 468 days.

(21) Appl. No.: 12/860,650

(22) Filed: Aug. 20, 2010

(65) Prior Publication Data

US 2011/0122461 A1  May 26, 2011

(30) Foreign Application Priority Data

Nov. 25, 2009  (JP) ................. 2009-268003

(51) Int. Cl.
*G06F 15/00* (2006.01)
*G06F 3/12* (2006.01)
*G06K 1/00* (2006.01)
*H04N 1/60* (2006.01)

(52) U.S. Cl.
USPC .......................................... 358/1.13; 358/1.9

(58) Field of Classification Search
None
See application file for complete search history.

(56) References Cited

U.S. PATENT DOCUMENTS

| | | | |
|---|---|---|---|
| 6,061,542 A | 5/2000 | Minami et al. | |
| 6,104,891 A | 8/2000 | Maebashi et al. | |
| 6,522,850 B2 * | 2/2003 | Hiroki | 399/164 |
| 6,738,594 B2 | 5/2004 | Nakagawa et al. | |
| 6,813,463 B2 * | 11/2004 | Kamiyama | 399/302 |
| 6,941,102 B2 | 9/2005 | Sasamoto et al. | |
| 8,290,385 B2 * | 10/2012 | Nakagawa et al. | 399/66 |
| 2005/0163515 A1 | 7/2005 | Inukai | |
| 2005/0201766 A1 * | 9/2005 | Tsukida et al. | 399/27 |
| 2006/0127140 A1 | 6/2006 | Miyake | |
| 2009/0035029 A1 | 2/2009 | Kobayashi | |
| 2009/0153091 A1 * | 6/2009 | Tsujimoto et al. | 318/561 |
| 2011/0123235 A1 | 5/2011 | Matsuzaki | |

FOREIGN PATENT DOCUMENTS

| | | |
|---|---|---|
| JP | 10-307448 A | 11/1998 |
| JP | 11-65315 A | 3/1999 |
| JP | 2001-092196 A | 4/2001 |
| JP | 3731023 B2 | 10/2005 |
| JP | 3799763 B2 | 7/2006 |
| JP | 2006-235050 A | 9/2006 |
| JP | 4154031 B2 | 9/2008 |
| JP | 2009-53668 A | 3/2009 |

OTHER PUBLICATIONS

Japanese Office Action issued Aug. 20, 2013 in corresponding Japanese Patent Application No. 2009-268003.

* cited by examiner

*Primary Examiner* — Douglas Tran
(74) *Attorney, Agent, or Firm* — Sughrue Mion, PLLC (57) ABSTRACT

An image-forming apparatus includes: a memory that stores a plurality of image forming modes; a contact controller that controls a status of contact between a plurality of image-forming units and an intermediate transfer member on the basis of an image forming mode selected from among the plurality of image forming modes, so that an image-forming unit used for image forming represented in the selected image forming mode is contacted with the intermediate transfer member, and another image-forming unit is moved away from the intermediate transfer member; and an image-quality adjusting unit that adjusts, if the status of contact is changed by the contact controller, an image quality of an image that is to be transferred onto the intermediate transfer member from the image-forming unit that is in contact with the intermediate transfer member.

10 Claims, 6 Drawing Sheets

| | CONDITION CONTROL | ENVIRONMENT (TEMPERATURE) | ENVIRONMENT (LEVEL OF HUMIDITY) | NUMBER OF PRINT | STOP TIME |
|---|---|---|---|---|---|
| DENSITY ADJUSTMENT | ○ | ○ | ○ | ○ | ○ |
| COLOR MISREGISTRATION ADJUSTMENT | ○ | ○ | ○ | × | × |

IMAGE-FORMING APPARATUS

CROSS-REFERENCE TO RELATED APPLICATIONS

This application is based on and claims priority under 35 USC 119 from Japanese Patent Application No. 2009-268003 filed on Nov. 25, 2009.

BACKGROUND

1. Technical Field

The present invention relates to an image-forming apparatus.

2. Related Art

An image-forming apparatus that forms an image of plural colors has image-forming engines. Each of the image-forming engines may be separated from an intermediate transfer member when the image-forming engine is not being used for image forming.

SUMMARY

According to an aspect of the invention, there is provided an image-forming apparatus including: an intermediate transfer member on which an image is transferred; a plurality of image-forming units arranged along the intermediate transfer member, each of which forms an image to be transferred onto the intermediate transfer member; a memory that stores a plurality of image forming modes, each of the plurality of image forming modes representing at least an image-forming unit used for image forming from among the plurality of image-forming units; a contact controller that controls a status of contact between the plurality of image-forming units and the intermediate transfer member on the basis of an image forming mode selected from among the plurality of image forming modes, so that an image-forming unit used for image forming represented in the selected image forming mode is contacted with the intermediate transfer member, and another image-forming unit is moved away from the intermediate transfer member; and an image-quality adjusting unit that adjusts, if the status of contact is changed by the contact controller, an image quality of an image that is to be transferred onto the intermediate transfer member from the image-forming unit that is in contact with the intermediate transfer member.

BRIEF DESCRIPTION OF THE DRAWINGS

Exemplary embodiments of the present invention will now be described in detail based on the following figures, wherein.

DETAILED DESCRIPTION

Hereinafter, an exemplary embodiment of the present invention will be described with reference to drawings.

First Exemplary Embodiment

Firstly, description is made of the first exemplary embodiment of the present invention.

Configuration in First Exemplary Embodiment

Figure 1:
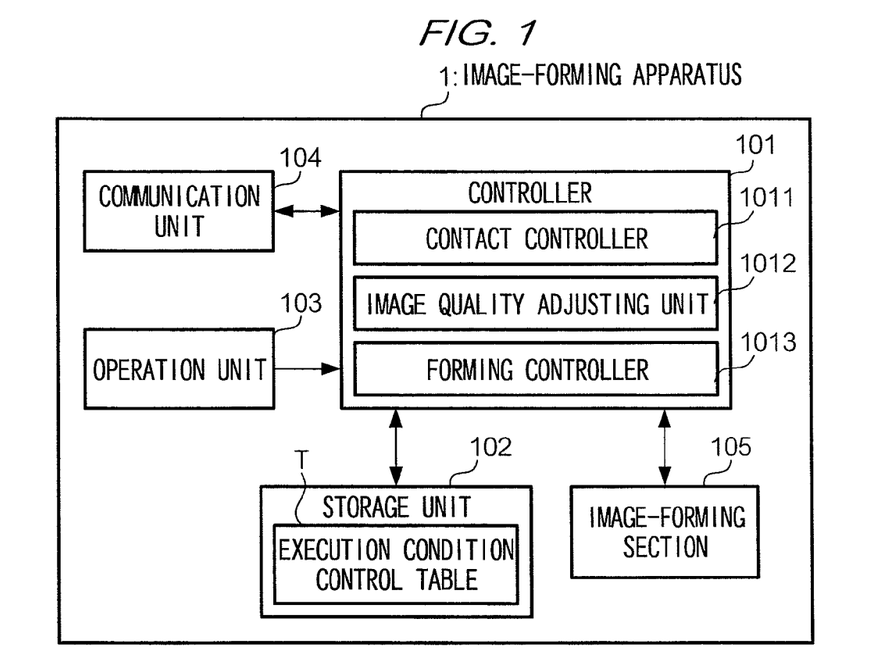
FIG. 1 shows a configuration of an image-forming apparatus.

FIG. 1 shows a block diagram of a configuration of image-forming apparatus 1 according to the exemplary embodiment of the present invention. Image-forming apparatus 1 has controller 101, storage unit 102, operation unit 103, communication unit 104, and image-forming section 105.

Controller 101 has an arithmetic unit that includes Central Processing Unit (CPU) and a memory. The arithmetic unit executes a control program stored in the memory to control components of image-forming apparatus 1. Storage unit 102 has a storage device such as a Hard Disk Drive (HDD) to store various information, such as image data that is provided for image forming, and execution condition control table T. Operation unit 103 has keys such as buttons or the like to provide to controller 101 operation information that represents an operation performed by a user. Communication unit 104 has an interface to transfer data to and receive data from an external device. For example, communication unit 104 acquires from the external device image data that is provided for image forming. Image-forming section 105 has a function to form an image on a recording medium using toner as a color material. The recording medium is, for example, a recording sheet; however the recording medium may be a plastic sheet such as a viewgraph, or a sheet made of other materials if the recording medium is capable of recording an image on its surface.

Figure 2:
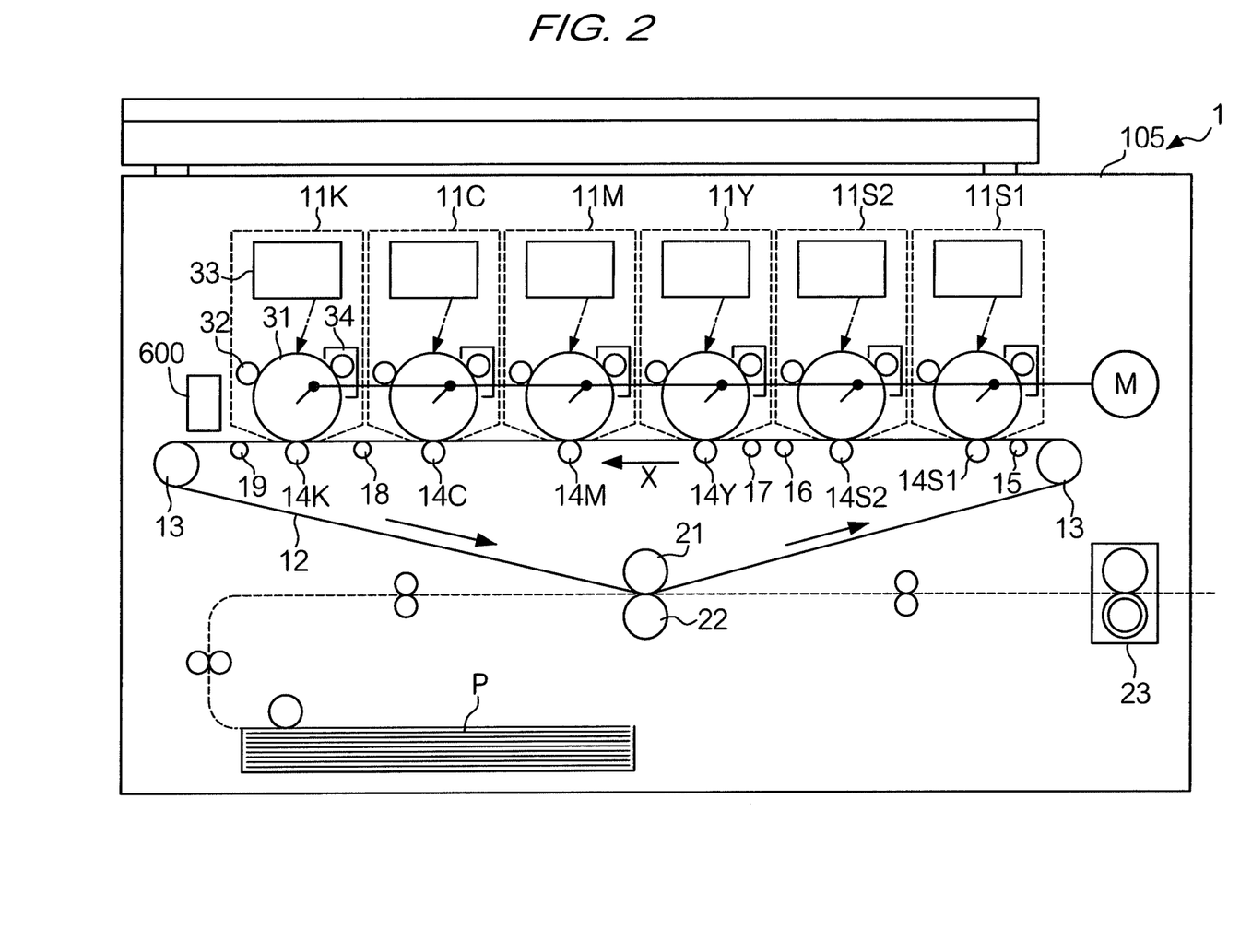
FIG. 2 shows a configuration of an image-forming section.

FIG. 2 shows a configuration of image-forming section 105. Image-forming section 105 has a function to form an image in an electrophotographic process. Image-forming section 105 forms an image using a toner of total six colors: four basic colors, yellow (Y), magenta (M), cyan (C), and black (K), and two special colors, a first special color (S1), and a second special color (S2). In this exemplary embodiment, the first special color is clear (colorless and transparent), and the second special color is low glossy black. Image-forming section 105 has six image-forming units 11Y, 11M, 11C, 11K, 11S1, and 11S2.

Among reference numerals assigned to the components of image-forming unit 105, reference numerals with a letter (Y, M, C, or K) or a letter and a number (S1 or S2) indicate that the component is related to image forming in a color corresponding to the letter (or the letter and the number). The components indicated by reference numerals that differ only by the appended letter (or the letter and the number) have the same configuration, although their positions and a developer used are different. The appended letter (or the letter and the number) is omitted, except where it is necessary to distinguish between these components.

Image-forming unit 11 is an example of an image-forming unit of the present invention. Each of image-forming units 11 has charging device 32 that charges the surface of photosensitive drum 31, exposure device 33 that irradiates photosensitive drum 31 to form an electrostatic latent image on photosensitive drum 31, and developing device 34 that develops the electrostatic latent image on photosensitive drum 31 to form a toner image on photosensitive drum 31. Image-forming units 11 are each detachable from image-forming apparatus 1.

Intermediate transfer belt 12 is an example of an intermediate transfer member of the present invention. Intermediate transfer belt 12 is an endless belt-shaped member that is made of a flexible synthetic resin film, such as polyimide. Intermediate transfer belt 12 is caused to rotate in a direction indicated by arrow X of FIG. 2, while contacting rotating rollers 13, primary transfer rollers 14, and backup roller 21. Image-forming units 11Y, 11M, 11C, 11K, 11S1, and 11S2 are aligned along a conveyance direction (a direction indicated by arrow X) of intermediate transfer belt 12 from an upstream side to a downstream side in the conveyance direction. Primary transfer rollers 14Y, 14M, 14C, 14K, 14S1, and 14S2 are provided so that each of the primary transfer rollers faces photosensitive drum 31 of corresponding image-forming units 11 via intermediate transfer belt 12. Each of primary transfer rollers 14Y, 14M, 14C, 14K, 14S1, and 14S2 transfers a toner image onto intermediate transfer belt 12. A transfer process, in which toner images are transferred onto intermediate transfer belt 12, may be referred to hereinafter as a primary transfer process.

Rotating rollers 13 are cylindrical members to support a movement of intermediate transfer belt 12. Each of rotating rollers 13 rotates about the center of a cylinder as an axis. One rotating roller 13 is rotated by a drive unit while the other rotating roller 13 is rotated according to the movement of intermediate transfer belt 12. Primary transfer rollers 14 are an example of a transferring unit of the present invention. Each of primary transfer rollers 14 is a cylindrical member that faces a corresponding photosensitive drum 31 via intermediate transfer belt 12. Each of primary transfer rollers 14 generates a electric field for transfer that acts on intermediate transfer belt 12 while a primary transfer bias or a primary transfer current is provided, whereby a toner image formed on photosensitive drums 31 is transferred onto intermediate transfer belt 12. Secondary transfer roller 22 is a cylindrical member that faces backup roller 21 via intermediate transfer belt 12. Secondary transfer roller 22 transfers a toner image formed on intermediate transfer belt 12 onto recording medium P by generating an electric potential difference between secondary transfer roller 22 and backup roller 21. Fixing device 23 applies heat and pressure to recording medium P on which a toner image is transferred, so that the toner image is fixed on recording medium P. Recording medium P, on which the image is formed in a manner described above, is output to the outside of the apparatus.

Reader 600 is, for example, an Auto Developability Control (ADC) sensor. Reader 600 irradiates the surface of intermediate transfer belt 12 with a sensor light, and upon receiving a reflected light, outputs to controller 101 a signal on the basis of an amount of the received light. Reader 600 is provided just downstream relative to image-forming unit 11K in the conveyance direction (namely, a direction indicated by arrow X of FIG. 2) of intermediate transfer belt 12. After toner images are transferred onto intermediate transfer belt 12 by image-forming units 11, reader 600 reads the surface of intermediate transfer belt 12.

Image-forming section 105 with the above configuration forms an image in one color mode (an example of an image forming mode) selected from among plural color modes in which different image-forming units 11 are used. In image-forming section 105, photosensitive drum 31 that is not used in the selected color mode is separated from intermediate transfer belt 12. This is because if intermediate transfer belt 12 is caused to move as it contacts photosensitive drums 31, friction is generated between intermediate transfer belt 12 and photosensitive drums 31; as a result, intermediate transfer belt 12 and photosensitive drums 31 may be damaged.

To bring photosensitive drum 31 into contact with intermediate transfer belt 12, controller 101 moves primary transfer roller 14 that faces this photosensitive drum 31 in an upward direction by way of a moving mechanism (not shown). On the other hand, to separate photosensitive drum 31 from intermediate transfer belt 12, controller 101 moves primary transfer roller 14 that faces this photosensitive drum 31 in a downward direction. Retract rollers 15 to 19 are provided on a side opposite to image-forming units 11 via intermediate transfer belt 12. The moving mechanism (not shown) is also connected to retract rollers 15 to 19. Retract rollers 15 to 19 are moved in upward/downward directions on the basis of a color mode by the same rule as primary transfer rollers 14.

FIGS. 3A to 3C and 4A to 4D each show image-forming section 105 in each color mode. In FIGS. 3A to 3C and 4A to 4D, photosensitive drum 31 being in contact with intermediate transfer belt 12 is indicated by a solid line; while photosensitive drum 31 not being in contact with intermediate transfer belt 12 is indicated by a dotted line. It is to be noted that primary transfer rollers 14 are not shown in FIGS. 3A to 3C and 4A to 4D.

Figure 3A:
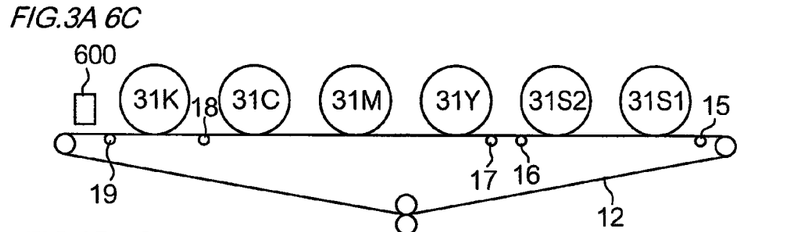
FIGS. 3A to 3C schematically show the image-forming section in each color mode.
Figure 3B:
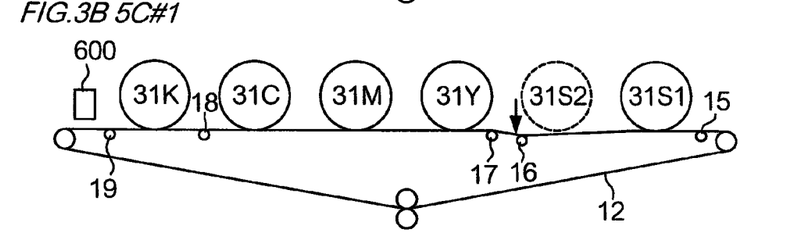
Figure 3C:
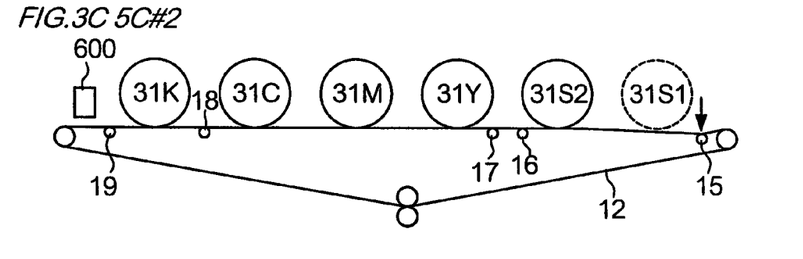

As shown in FIG. 3A, if a color mode is "6C," all of photosensitive drums 31 are brought into contact with intermediate transfer belt 12. In this case, retract rollers 15 to 19 are caused to move in the upward direction so that intermediate transfer belt 12 is pressed against the photosensitive drums 31. As shown in FIG. 3B, if a color mode is "5C#1," five colors: first special color S1, and basic colors Y, M, C, and K are used. In this case, retract roller 16 is caused to move in the downward direction so that photosensitive drums 31Y, 31M, 31C, 31K, and 31S1 are brought into contact with intermediate transfer belt 12; while photosensitive drum 31S2 is separated from intermediate transfer belt 12. As shown in FIG. 3C, if a color mode is "5C#2," five colors: second special color S2, and basic colors Y, M, C, and K are used. In this case, retract rollers 16 to 19 are caused to move to an upper position so that photosensitive drums 31Y, 31M, 31C, 31K, and 31S2 are brought into contact with intermediate transfer belt 12. Meanwhile, retract roller 15 is caused to move in the downward direction so that photosensitive drum 31S1 is separated from intermediate transfer belt 12.

Figure 4A:
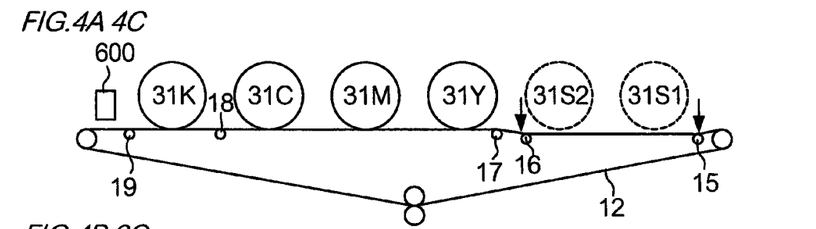
FIGS. 4A to 4D schematically show the image-forming section in each color mode.
Figures 4B, 4C:
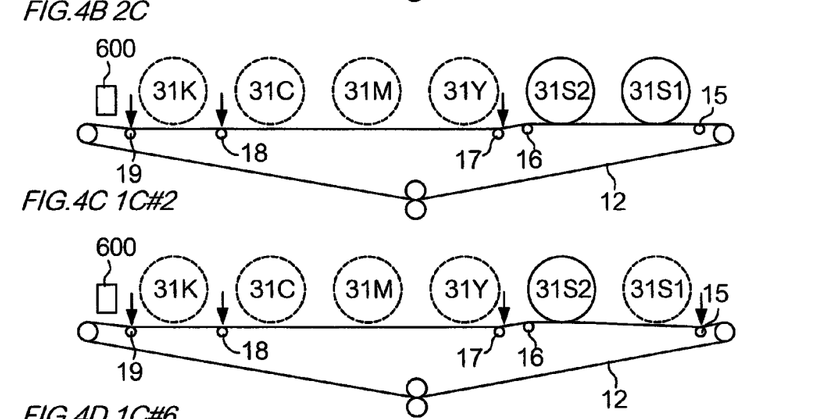
Figure 4D:
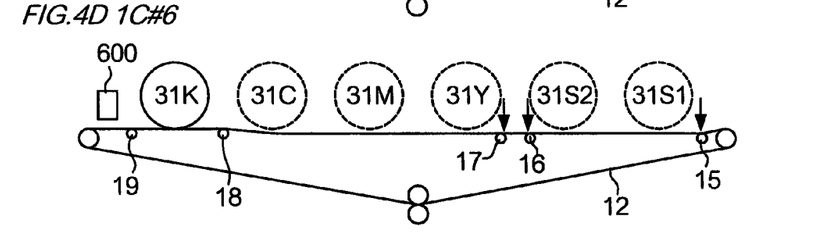

As shown in FIG. 4A, if a color mode is "4C," retract rollers 15 and 16 are caused to move in the downward direction so that photosensitive drums 31Y, 31M, 31C, and 31K are brought into contact with intermediate transfer belt 12, and photosensitive drums 31S1 and 31S2 are separated from intermediate transfer belt 12. As shown in FIG. 4B, if a color mode is "2C," retract rollers 17, 18, and 19 are caused to move in the downward direction so that photosensitive drums 31S1 and 31S2 are brought into contact with intermediate transfer belt 12, and photosensitive drums 31Y, 31M, 31C, and 31K are separated from intermediate transfer belt 12. As shown in FIG. 4C, if a color mode is "1C#2," retract rollers 15, 17, 18, and 19 are caused to move in the downward direction so that only photosensitive drum 31S2 is brought into contact with intermediate transfer belt 12. As shown in FIG. 4D, if a color mode "1C#6," retract rollers 15, 16, and 17 are caused to move in the downward direction so that only photosensitive drum 31K is brought into contact with intermediate transfer belt 12.

Next, description is made of a function realized by controller 101. Contact controller 1011 controls a status of contact between image-forming units 11 and intermediate transfer belt 12 when image-forming section 105 forms an image on the basis of one color mode selected from among plural color modes. Contact controller 1011 brings image-forming unit(s) 11 that is used for image forming in the selected color mode into contact with intermediate transfer belt 12 such that a predetermined nip pressure is generated therebetween, and separates other image-forming unit(s) 11 from intermediate transfer belt 12. A status of contact indicates a status of contact between image-forming units 11 and intermediate transfer belt 12. The status of contact includes a status in which image-forming unit(s) 11 and intermediate transfer belt 12 are in contact with each other and a status in which image-forming unit(s) 11 and intermediate transfer belt 12 are not in contact with each other. The status of contact may be represented by a level of pressure generated between image-forming unit(s) 11 and intermediate transfer belt 12. A control of the status of contact is referred to hereinafter as "contact control." Specifically, the contact control indicates a control to move at least one of primary transfer rollers 14 and retract rollers 15 to 19 in upward/downward directions. The contact control changes a condition in which toner images are transferred from image-forming unit(s) 11 to intermediate transfer belt 12.

Image quality adjusting unit 1012 executes a control to adjust an image quality of a toner image in response to a change of a color mode (in other words, a change of a status of contact). Forming controller 1013 controls image-forming section 105 to form an image in accordance with an image quality adjusted by adjusting unit 1012. Specifically, forming controller 1013 transfers from image-forming unit 11 onto intermediate transfer belt 12 a toner image that has an image quality adjusted by quality adjusting unit 1012, while causing to move intermediate transfer belt 12 in the direction indicated by arrow X.

A toner image transferred from one image-forming unit 11 to intermediate transfer belt 12 may be further transferred to photosensitive drum 31 of another image-forming unit 11 that is located downstream in the conveyance direction relative to one image-forming unit 11 (referred to as a reverse transfer, or a retransfer). If a color mode is changed, an effect caused by such a reverse transfer may be changed, thus a density of an image of each color formed by image-forming section 105 may be changed each time a color mode is changed. Image quality adjusting unit 1012 adjusts a density of a toner image changed due mainly to a change of a color mode.

Figure 5:
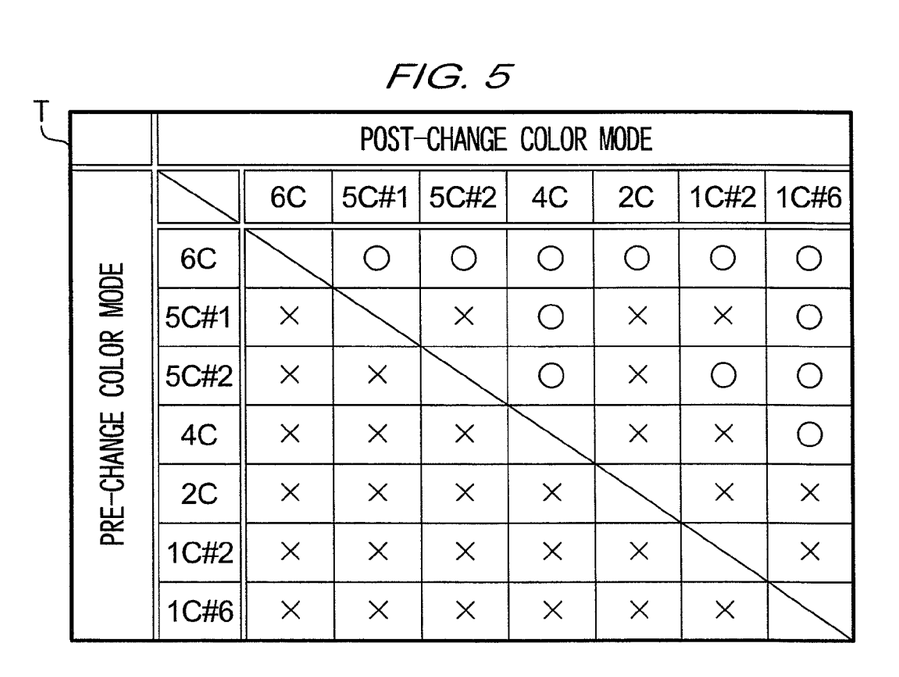
FIG. 5 shows an example of an execution condition control table.

FIG. 5 shows an example of execution condition control table T stored in storage unit 102. In execution condition control table T, a correspondence relation is described between combinations of a pre-change color mode and a post-change color mode and information specifying whether to determine necessity for an image quality adjustment to be executed by image quality adjusting unit 1012. In FIG. 5, "0" means that it is possible to omit an image quality adjustment, and "X" means that it is not possible to omit an image quality adjustment. For example, if a color mode is changed from "5C#1" to "6C," image quality adjusting unit 1012 always executes an image quality adjustment. On the other hand, if a color mode is changed from "6C" to "5C#1," image quality adjusting unit 1012 does not execute an image quality adjustment if a user sets an image quality adjustment as not to be executed.

In execution condition control table T of FIG. 5, "X" is assigned to combinations of color modes in which image-forming unit(s) 11 is brought into contact with intermediate transfer belt 12 when a color mode is changed and "O" is assigned to other combinations.

Operation in First Exemplary Embodiment

Figure 6:
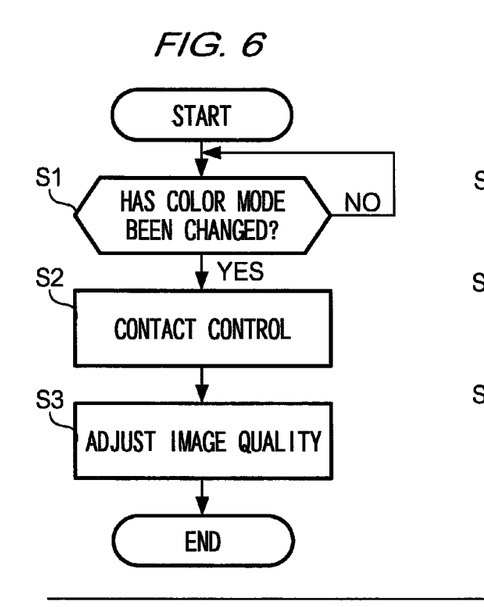
FIG. 6 shows a flow chart of an operating procedure executed by a controller.

Next, description is made of an operation of image-forming apparatus 1. FIG. 6 shows a flow chart of an operating procedure regarding an image quality adjustment executed by controller 101.

Controller 101 firstly determines whether a color mode has been changed (step S1). For example, controller 101 determines the color mode depending on a toner that is used for image forming on the basis of image data provided for image forming. Controller 101 may determine a color mode on the basis of an operation of operation unit 103 by a user, such as an operation to select a single color mode or a so-called full color mode.

If controller 101 determines that the color mode has been changed (step S1; YES), controller 101 executes a contact control on the basis of the color mode (step S2). In this step, controller 101 executes a contact control so that image-forming unit(s) 11 used in a post-change color mode is brought into contact with intermediate transfer belt 12, and other image-forming unit(s) 11 is separated from intermediate transfer belt 12.

Controller 101 then adjusts an image quality of a toner image(s) to be transferred from image-forming unit(s) 11 onto intermediate transfer belt 12 on the basis of execution condition control table T and a combination of the pre-change color mode and the post-change color mode (step S3). If controller 101 determines to execute the image quality adjustment, controller 101 specifies image-forming unit(s) 11 that is a subject of the adjustment, and adjusts an image quality of a toner image(s) with respect to specified image-forming unit(s) 11. In this step, controller 101 adjusts an image quality with respect to all of image-forming unit(s) 11 that is in contact with intermediate transfer belt 12 after the color mode is changed.

For example, controller 101 executes, in step S3, an image quality adjustment as described below.

Figure 7:
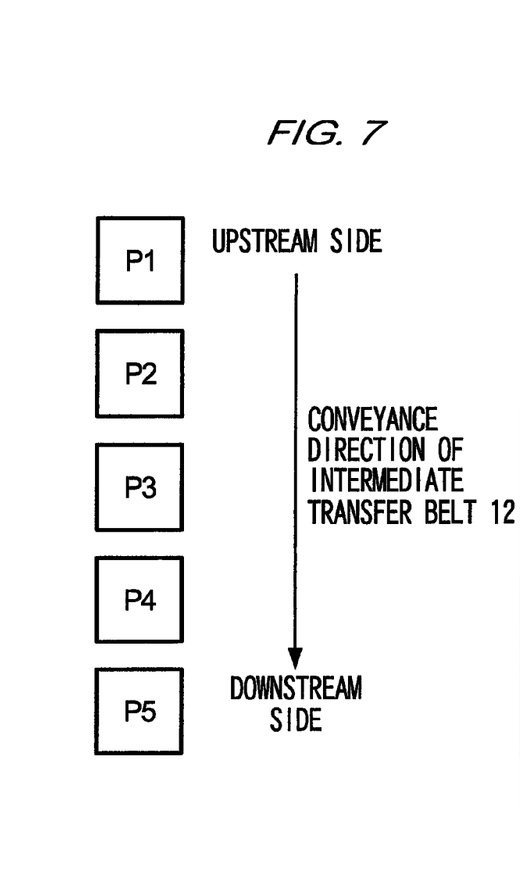
FIG. 7 shows an example of an image used for image quality adjustment.

FIG. 7 shows an example of images used for an image quality adjustment of a toner image. Color patches P1 to P5 of FIG. 7 are rectangular images, each of which is formed at a certain image density using a toner of any of colors Y, M, C, K, S1, and S2. For example, color patches P1 to P5 have image densities different from each other (in other words, coverage of a toner in a surface of a recording medium per unit of area). Color patches P1 to P5 for colors are aligned from an upstream side to a downstream side in a conveyance direction of intermediate transfer belt 12.

In step 3, controller 101 causes image-forming units 11 to sequentially transfer color patches P1 to P5 to intermediate transfer belt 12, and causes reader 600 to read the surface of intermediate transfer belt 12. Controller 101 specifies a density (an optical density) of each of color patches P1 to P5 on the basis of the result from reading color patches P1 to P5. Controller 101 then adjusts an image quality of toner images such that density differences between densities of color patches P1 to P5 and target densities of color patches P1 to P5 are respectively reduced.

In this exemplary embodiment, controller 101 adjusts an image quality with respect to image-forming units 11 by changing an image forming condition in which image-forming section 105 forms an image. The image forming condition is, for example, an amount of toner supplied from toner container (not shown) to developing device 34. For example, controller 101 sets an image forming condition to increase a supplied amount of toner in order to increase a density of a color patch, as the density is lower than a targeted density. However, the image forming condition is not limited to the amount of supplied toner. For example, an image forming condition may be an amount of an exposure light emitted from exposure device 33, a charging potential used by charging device 32 to charge photosensitive drum 31, a developing bias potential of developing device 34, and a primary transfer bias (an electric field for transfer) of primary transfer roller 14. The image forming condition may be a combination of these conditions.

Controller 101 may correct image data to be provided to image-forming section 105 for image forming. Various well-known techniques may be employed as a method to adjust an image quality regarding a density.

According to image-forming apparatus 1 described above, an image quality of each toner image can be adjusted on the basis of a status of contact of the toner image between intermediate transfer belt 12 and plural image-forming units 11 that form toner images for colors different from each other. As a result, a change of a density of a toner image caused by a change of a color mode is prevented.

Modification of First Exemplary Embodiment

In the first exemplary embodiment, controller 101 executes an image quality adjustment on all of image-forming unit(s) 11 that contacts intermediate transfer belt 12 after the color mode is changed. This operation may be modified as described in the following operation examples 1 to 4.

Operation Example 1

Controller 101 may adjust an image quality with respect to image-forming unit(s) 11 that is newly brought into contact with intermediate transfer belt 12 when a color mode is changed. In other words, controller 101 executes an image quality adjustment on image-forming unit(s) 11 that has been spaced apart from intermediate transfer belt 12 before the color mode is changed. For example, if controller 101 changes a color mode from "5C#1" to "5C#2," controller 101 executes an image quality adjustment on image-forming unit 11S2; while controller 101 does not execute the image quality adjustment on image-forming units 11Y, 11M, 11C, and 11K. This is because, in image-forming unit 11 that has been not used for a while, a density of a toner image formed by the units is prone to be unstable, for example, since a charged status of a toner in developing device 34 changes, as compared with a case where image-forming unit 11 is used continuously. According to operation example 1, an image quality adjustment is executed with respect to only image-forming unit 11 that is likely to form a toner image whose density is unstable, thus an amount of toner consumed for an image quality adjustment is reduced, and time required for an image quality adjustment is reduced, as compared with that of the first exemplary embodiment.

Operation Example 2

Controller 101 may adjust an image quality with respect to image-forming unit(s) 11 whose status of contact changed due to a change of a color mode, and other image-forming unit(s) 11 that is arranged adjacent to this image-forming unit(s) 11. In other words, controller 101 adjusts an image quality with respect to image-forming unit(s) 11 that is newly brought into contact with intermediate transfer belt 12 when a color mode is changed, and other image-forming unit(s) 11 that is arranged adjacent to this image-forming unit(s) 11 and that is in contact with intermediate transfer belt 12. Alternatively, controller 101 adjusts an image quality with respect to image-forming unit(s) 11 that is newly separated from intermediate transfer belt 12; and other image-forming unit(s) 11 that is arranged adjacent to this image-forming unit(s) 11 and that is in contact with intermediate transfer belt 12. For example, if a color mode is changed from "6C" to "5C#1," controller 101 executes an image quality adjustment on only image-forming units 11Y, 11S2, and 11S1; while controller 101 does not execute the image quality adjustment on image-forming unit 11M, 11C, and 11K. As described above, when an image-forming unit 11 transfers a toner image onto intermediate transfer belt 12, a toner may be reverse-transferred on photosensitive drum 31 of image-forming unit 11 that is located on the downstream side of the image-forming unit 11. Particularly, adjacent image-forming units 11 are greatly affected by reverse transfer. According to operation example 2, an amount of toner required for an image quality adjustment is further reduced, and a change of a density is prevented, as compared with that of operation example 1.

Operation Example 3

Controller 101 may adjust an image quality with respect to image-forming unit(s) 11 that is newly brought into contact with intermediate transfer belt 12 when a color mode is changed; and other image-forming unit(s) 11 that is arranged adjacent to this image-forming unit(s) 11 and upstream in the conveyance direction relative to this image-forming unit(s) 11, and that is in contact with intermediate transfer belt 12. For example, if a color mode is changed from "1C#2" to "2C," controller 101 executes an image quality adjustment on image-forming units 11S1 and 11S2. The reason why adjacent image-forming unit 11 that is arranged upstream in a conveyance direction is the subject of the adjustment is as described in operation example 2. The reason why image-forming unit 11 that is newly brought into contact with intermediate transfer belt 12 is the subject of the adjustment is as described in operation example 1.

Operation Example 4

Controller 101 may not execute an image quality adjustment if image-forming unit 11 does not exist that is newly brought into contact with intermediate transfer belt 12 when a color mode is changed. For example, if a color mode is changed from "6C" to "5C" to "4C," no image-forming unit 11 may be brought into contact with intermediate transfer belt 12. In this case, it is considered that no change to reduce a density of a toner image arises, thus visibility of a user is not negatively affected by an image formed by image-forming section 105 being extremely light. Therefore, it is considered that a negative effect is small in this case even if an image quality adjustment is omitted.

Second Exemplary Embodiment

Next, description is made of the second exemplary embodiment of the present invention. In the first exemplary embodiment, controller 101 executes an adjustment regarding a density when adjusting an image quality of a toner image; while in this exemplary embodiment, controller 101 adjusts a relative position gap between toner images of plural colors (known as a misregistration) when adjusting an image quality of a toner image. This is because, when a color mode is changed, a tension of intermediate transfer belt 12 is changed depending on a change of a status of contact between image-forming units 11 and intermediate transfer belt 12, and a position at which each toner image is transferred is changed. For example, if a color mode is changed from "6C" to "5C#2," image-forming unit 11S1 is separated from intermediate transfer belt 12. At this time, a distance between image-forming unit 11S1 and image-forming unit 11Y is slightly changed. Such a change of a distance between the units can cause a misregistration.

It is to be noted that a configuration of image-forming apparatus 1 is common to the first and second exemplary embodiments, although details of an image quality adjustment executed by image quality adjusting unit 1012 are different.

Figure 8:
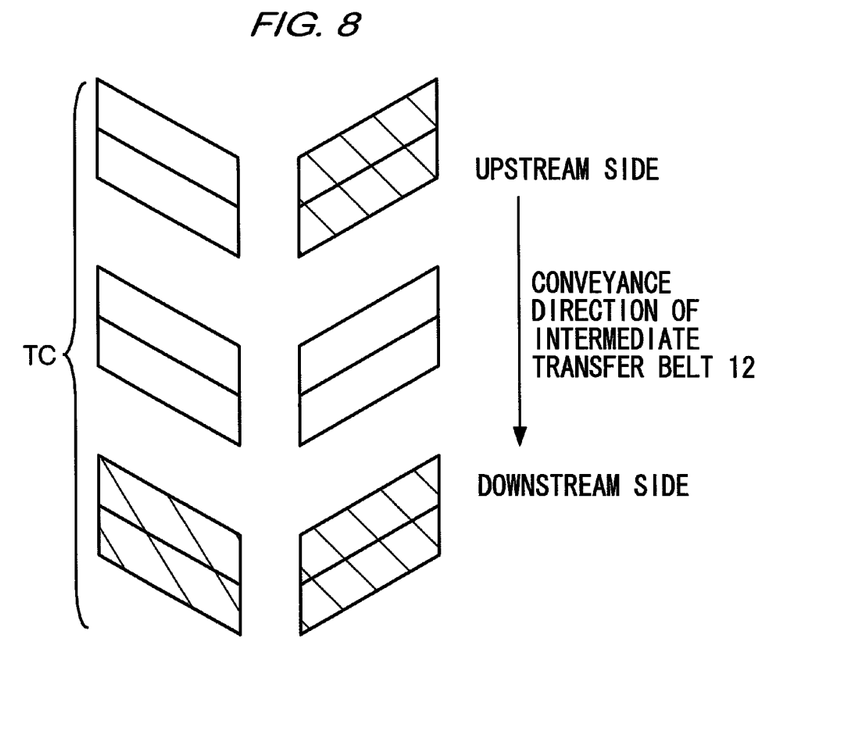
FIG. 8 shows an example of an image used for image quality adjustment.

FIG. 8 shows an example of an image used for an image quality adjustment of a toner image. Mountain-shaped images TC are used here for detecting a misregistration. Each of images TC has line images inclined at an identical degree from the center to both sides. Images TC are arranged at positions maintaining a certain space apart from each other in the conveyance direction of intermediate transfer belt 12. Regions indicated by hatching in images TC are formed by certain image-forming unit(s) 11 (an example of a first image-forming unit of the present invention), and other regions are formed by other image-forming unit(s) 11 (an example of a second image-forming unit of the present invention). Image quality adjusting unit 1012 calculates an amount of a misregistration between images of colors by reading, by way of reader 600, intermediate transfer belt 12 on which images TC are formed. Description of a calculation of the amount of a misregistration is omitted, since well-known techniques, such as a technique described in JP-2007-272125-A, can be employed. Image quality adjusting unit 1012 adjusts an image quality of a toner image on the basis of the amount of a misregistration between images of colors so that the amount of the misregistration is reduced. For the adjustment, well-known techniques to correct a position at which each image is formed by image-forming section 105 can be employed. For example, image quality adjusting unit 1012 makes an electronical adjustment to an electric circuit or a signaling system to adjust an exposure intensity or an exposure position of exposure device 33, or corrects image data to be provided to image-forming section 105.

Figure 9:
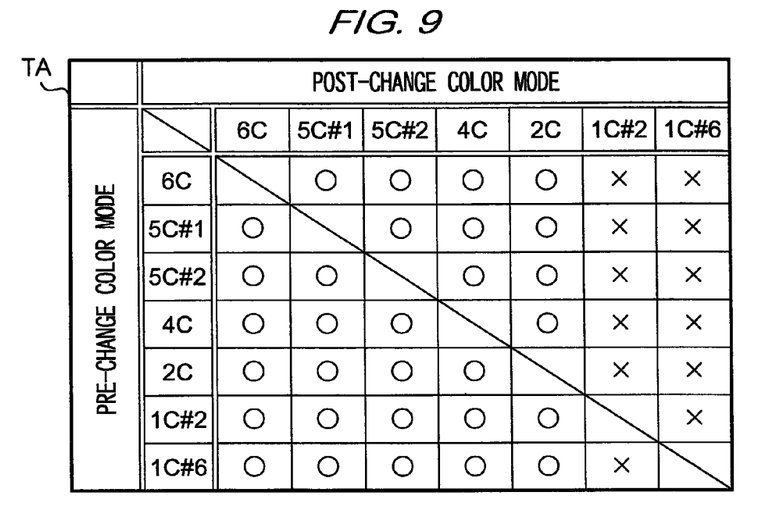
FIG. 9 shows an example of an execution control table.

FIG. 9 shows an example of execution control table TA stored in storage unit 102 in this exemplary embodiment. In execution control table TA, combinations of a pre-change color mode and a post-change color mode, and necessity of an image quality adjustment regarding a misregistration are described. "O" means that an image quality adjustment is executed, and "X" means that an image quality adjustment is not executed. Image quality adjusting unit 1012 determines whether to execute an image quality adjustment on the basis of execution control table TA.

As shown in FIG. 9, in execution control table TA, "O" is assigned to combinations that include a post-change color mode in which plural image-forming units 11 are used (namely, 6C, 5C#1, 5C#2, 4C, 2C), "X" is assigned to other combinations. This is because an image quality adjustment regarding a misregistration reduces a relative position gap between toner images of different colors. Controller 101 executes an image quality adjustment only if an image is formed by plural image-forming units 11 in a post-change color mode. The subject of an image quality adjustment may be all of image-forming unit(s) 11 that contact intermediate transfer belt 12. Alternatively, the subject of an image quality adjustment may be image-forming unit(s) 11 that is the subject of an image quality adjustment in operation example 1 or operation example 2 of the first exemplary embodiment.

In addition, image-forming unit 11S1 that uses transparent toner S1 does not have to be the subject of an image quality adjustment with regard to misregistration. Transparent toner S1, for example, is provided to almost the whole surface of recording medium P to form a high glossy image, but is not used for the purpose of improving visibility of an image. Further, if misregistration arises with regard to transparent toner S1, the misregistration is only faintly visible.

Third Exemplary Embodiment

Next, description is made of the third exemplary embodiment of the present invention. In this exemplary embodiment, image-forming apparatus 1 executes both an image quality adjustment regarding a density (referred to hereinafter as "density adjustment") as described in the first exemplary embodiment, and an image quality adjustment regarding a misregistration (referred to hereinafter as "color misregistration adjustment") as described in the second exemplary embodiment. In addition, image-forming apparatus 1 executes a control of the density adjustment and the color misregistration adjustment (referred to hereinafter as "condition control") if a predetermined condition for image quality adjustment (referred hereinafter as "adjustment condition") is satisfied. It is to be noted that a configuration of image-forming apparatus 1 is common to the first and the second exemplary embodiments, although details of an image quality adjustment performed by image quality adjusting unit 1012 are different.

Figure 10:
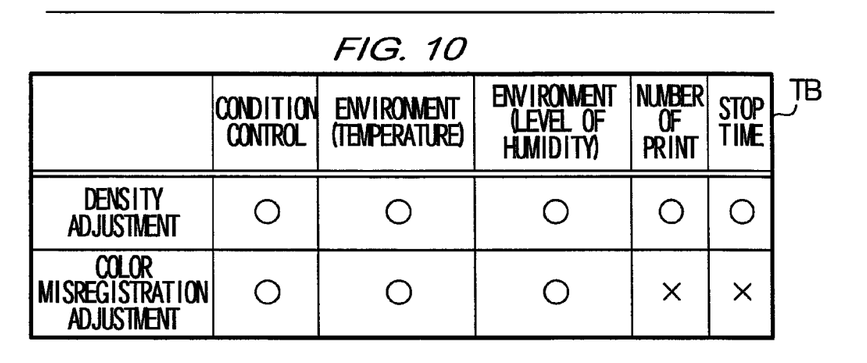
FIG. 10 shows an example of an adjustment condition control table.

FIG. 10 shows an example of adjustment condition control table TB. In FIG. 10, in fields of "condition control," information specifying whether to execute a condition control is described. "O" means that a condition control is executed, and "X" means that a condition control is not executed. In each of the fields of "environment (temperature)," "environment (level of humidity)," "number of print," "stop time," information specifying whether to execute an image quality adjustment on the basis of the adjustment condition, is described. "O" means whether to execute an image quality adjustment is specified on the basis of the adjustment condition, and "X" means whether to execute an image quality adjustment is not specified on the basis of the adjustment condition. A threshold value used to specify whether to execute an image quality adjustment is assigned for each adjustment condition. For example, with regard to "environment (temperature)," it may be specified that an image quality adjustment is executed if a temperature has changed by two degrees (plus or minus two degrees) since a previous image quality adjustment. With regard to "environment (level of humidity)," it may be specified that an image quality adjustment is executed if a level of humidity has changed by ten percent (plus or minus ten percent) since a previous image quality adjustment. With regard to "number of print," it may be specified that an image quality adjustment is executed if 1000 or more sheets of recording mediums have been used for image forming since a previous image quality adjustment. In addition, with regard to "number of print," it may be specified that an image quality adjustment is executed if a stop time has continued for 30 or more minutes since a previous image quality adjustment. With respect to "color misregistration adjustment," whether to execute an image quality adjustment is specified on the basis of adjustment conditions of "environment (temperature)" and "environment (level of humidity) because a misregistration is greatly affected by a tension of intermediate transfer belt 12. Adjustment conditions of "number of print" and "stop time" are not employed for "color misregistration adjustment" because these adjustment conditions have a small effect on the misregistration.

"O" or "X" in adjustment condition control table TB and the threshold values of the adjustment conditions may be determined at a design stage, or may be changed by a user. A threshold value of each adjustment condition may differ for each image-forming unit 11.

Figure 11:
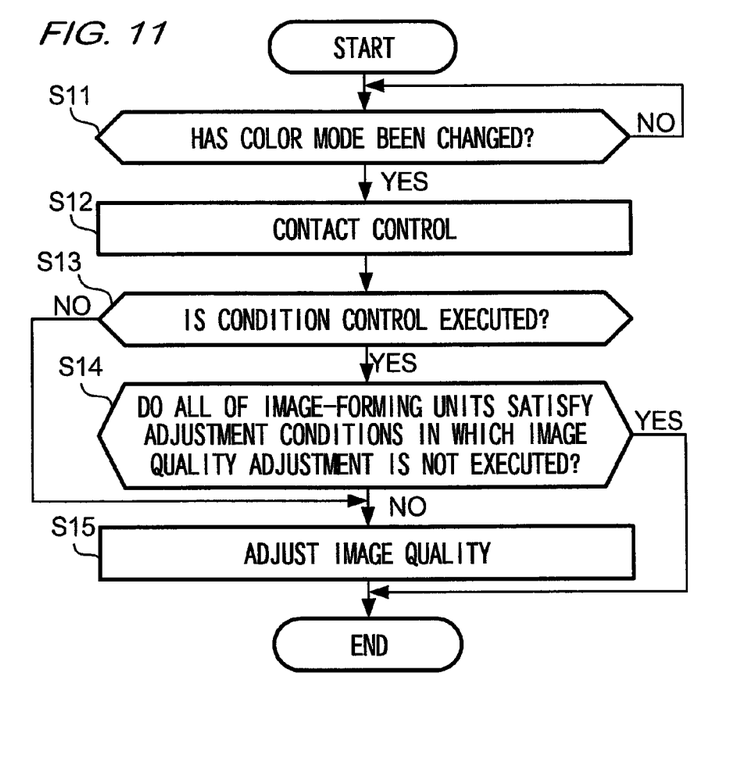
FIG. 11 shows a flowchart of an operating procedure executed by a controller.

Next, description is made of an operation of image-forming apparatus 1 in this exemplary embodiment. FIG. 11 shows a flowchart of an operating procedure regarding an image quality adjustment executed by controller 101. It is to be noted that the detailed description of the same operation as described in the first exemplary embodiment is omitted.

Controller 101 firstly determines whether a color mode has been changed (step S11). If controller 101 determines that the color mode has been changed (step S11; YES), controller 101 executes a contact control to change a status of contact between image-forming units 11 and intermediate transfer belt 12 (step S12).

Controller 101 then determines whether to execute a condition control (step S13). In this step, controller 101 refers to a field of "condition control" in adjustment condition control table TB, and determines to execute a condition control with respect to an image quality specified as being necessary in the corresponding field (step S13; YES). In adjustment condition control table TB of FIG. 10, it is specified that a condition control is executed with respect to both the density adjustment and the color misregistration adjustment. In this step, controller 101 determines whether to satisfy the adjustment conditions in which an image quality adjustment is not executed, with respect to all of image-forming unit(s) 11 that is used in a selected color mode (step S14). Controller 101 identifies adjustment conditions in adjustment condition control table TB with respect to each of "density adjustment" and "color misregistration adjustment." If the adjustment conditions in which the image quality adjustment is not executed are satisfied with respect to all of image-forming units 11 (step S14; YES), controller 101 does not execute an image quality adjustment.

Meanwhile, if at least one of image-forming units 11 does not satisfy the adjustment conditions (step S14; NO), controller 101 executes an image quality adjustment with respect to all of image-forming unit(s) 11 that contact intermediate transfer belt 12 (step S15). The image quality adjustment is specifically the density adjustment and the color misregistration adjustment. Details of the image quality adjustment are as described in the first and the second exemplary embodiments.

If controller 101 determines not to execute the condition control in step S13 (step S13; NO), controller 101 proceeds to step S15, and executes an image quality adjustment in the same manner as the first exemplary embodiment and the second exemplary embodiment. The subject of an image quality adjustment may be all of image-forming unit(s) 11 that contact intermediate transfer belt 12. Alternatively, the subject of an image quality adjustment may be image-forming unit(s) 11 that is the subject of an image quality adjustment in each of the operation examples of the first and the second exemplary embodiments.

According to image-forming apparatus 1 in the third exemplary embodiment, an image quality adjustment is executed only if a state of contact of image-forming unit 11 is changed, and adjustment conditions that are likely to be met when an image quality of a toner image changes are satisfied. By employing this operation, image-forming apparatus 1 executes an image quality adjustment only if an effect of the image quality adjustment is considered to be high. As a result, consumption of toner used for an image quality adjustment and increase of time required for an image quality adjustment may be prevented, while improving the effect.

Modification

The present invention can be practiced as a different exemplary embodiment from the exemplary embodiments described above. In addition, modifications described below may be combined with each other.

Modification 1

In each of the exemplary embodiments, image-forming apparatus 1 executes a contact control on the basis of a color mode so that image-forming unit(s) 11 and intermediate transfer belt 12 are caused to contact each other to generate a predetermined nip pressure, or image-forming unit(s) 11 and intermediate transfer belt 12 are spaced apart from each other. However, image-forming apparatus 1 may control a contact condition between image-forming unit(s) 11 and intermediate transfer belt 12 on the basis of a type of a recording medium. For example, controller 101 may change a level of pressure between primary transfer rollers 14 and photosensitive drums 31 (referred to hereinafter as "transfer pressure") during a primary transfer process, depending on a recording medium used for image forming, which is of a plane sheet or a sheet having asperity on the surface greater than the plain sheet (for example, a embossed sheet). The transfer pressure corresponds to a nip pressure generated by contact between image-forming units 11 and intermediate transfer belt 12.

Image-forming apparatus 1 according to this modification reduces a level of a transfer pressure if image-forming apparatus 1 operates in the second sheet mode in which the sheet having asperity on the surface greater than the plain sheet is used, as compared in a case where image-forming apparatus 1 operates in the first sheet mode in which the plain sheet is used. In the following description, a status of contact between image-forming unit(s) 11 and intermediate transfer belt 12 in the second sheet mode is referred to as "semi-contact," and a status of contact between image-forming unit(s) 11 and intermediate transfer belt 12 in the first sheet mode is referred to as "contact." The reason to employ "semi-contact" is to transfer a toner image onto the recording medium having asperity on the surface greater than a plane sheet, without lack of an image. Controller 101 may determine a sheet mode depending on a type of a recording medium selected by a user via operation unit 103, or determine a type of a recording medium by reading the recording medium by way of an optical sensor, and specifying an asperity level of the recording medium on the basis of a result of reading.

If a level of a transfer pressure is changed, a status of contact between image-forming unit 11 and intermediate transfer belt 12 is also changed, as a result an effect of the reverse transfer is changed. Therefore, controller 101 determines whether to execute an image quality adjustment on the basis of a status of contact depending on a sheet mode in the same manner as each of the exemplary embodiments. In other words, controller 101 executes an image quality adjustment in response to a change of a status of contact between image-forming units 11 and intermediate transfer belt 12.

For example, controller 101 may determine a sheet mode on the basis of a recording medium selected by a user via operation unit 103. A sheet mode may be employed in which a recording medium other than a plane sheet and an embossed sheet is used. There may be any number of sheet modes.

Controller 101 may change a level of a transfer pressure depending on a condition other than a type of recording medium, as long as the condition determines necessity of an operation of controller 101 to control a status of contact so that a pressure (a transfer pressure) having a level selected from among plural levels is generated between image-forming units 11 and intermediate transfer belt 12.

In this modification, condition of being "spaced" apart in each of operation examples 1 to 4 of the first exemplary embodiment may be replaced with a condition of "semi-contact." A state of a reverse transfer may be changed when a status of contact between image-forming units 11 and intermediate transfer belt 12 is changed from "semi-contact" to "contact," thus the same kind of effect is achieved as that when the condition is changed from "spaced" to "contact" described in each of the exemplary embodiments.

The present modification may be applied to image-forming apparatus 1 in which image-forming units 11 are not separated from intermediate transfer belt 12.

In the third exemplary embodiment, when a sheet mode is changed, controller 101 may always execute the color misregistration adjustment; while controller 101 may determine to execute the density adjustment using the condition control, so that an image formed by each image-forming unit 11 is at an identical position regardless of a type of recording medium.

An image-forming apparatus may have Auto Color Switching (ACS) mode to suspend an operation of an image-forming unit that is not used for image forming so that stress is prevented from being put on developers due to idle running of the developers. If image-forming apparatus 1 operates in ACS mode, image-forming apparatus 1 may determine, when an image-forming unit is re-driven from a stop state, whether to execute an image quality adjustment on the basis of adjustment conditions specified with regard to the image-forming unit.

Modification 2

Instead of the operation in modification 1, image-forming apparatus 1 may control a electric field for transfer that acts from primary transfer roller 14 on intermediate transfer belt 12 depending on a type of recording medium (in other words, a sheet mode). For example, if the electric field is reduced, an electrostatic force to transfer toner onto intermediate transfer belt 12 is also reduced; as a result a force of toner to adhere to intermediate transfer belt 12 is reduced. When controller 101 controls an electric field for transfer, a toner image can be transferred onto plural types of recording mediums that have surface asperities different from each other, without lack of an image. In this case, controller 101 serves as an example of a transfer controller of the present invention. If an image is formed in one mode selected from among plural modes (here sheet modes) in which electric fields for transfer different from each other act from primary transfer roller 14 on intermediate transfer belt 12, controller 101 controls an electric field for transfer on the basis of the mode.

Figure 12:
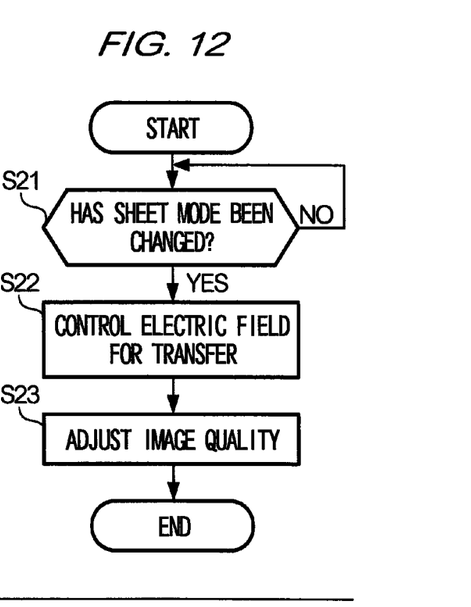
FIG. 12 shows a flow chart of an operating procedure executed by a controller.

FIG. 12 shows a flow chart of an operating procedure executed by controller 101 in this modification.

Controller 101 determines whether a sheet mode has been changed (step S21). If controller 101 determines that the sheet mode has been changed (step S21; YES), controller 101 controls an electric field for transfer activated by primary transfer rollers 14 on the basis of the sheet mode (step S22). Controller 101 then executes an image quality adjustment in response to a change of the electric field (step S23).

In this case, a state of a toner image transferred from image-forming unit 11 to intermediate transfer belt 12 is also affected by an intensity of the electric field. Controller 101, therefore, determines whether to execute an image quality adjustment depending on a change of the electric field in the same manner as described in each of the exemplary embodiments.

In this modification, image-forming apparatus 1 may not a have configuration to cause image-forming units 11 and intermediate transfer belt 12 to contact each other, and to cause image-forming units 11 and intermediate transfer belt 12 to separate from each other. A trigger to change an electric field for transfer is not limited to the sheet mode, but any mode may be employed.

Modification 3

In each of the exemplary embodiments, combinations of color modes and image-forming units 11 are merely examples. Any combination may be employed, and any number of color modes may be employed. The color of toner is also only an example. A toner of other colors may be used.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described to explain best the principles of the invention and its practical applications, thereby enabling others skilled in the art to understand the invention for various embodiments and with various modifications as are suited to a particular use contemplated. It is intended that the scope of the invention be defined by the following claims and their equivalents.

What is claimed is:

1. An image-forming apparatus comprising:
   an intermediate transfer member on which an image is transferred;
   a plurality of image-forming units arranged along the intermediate transfer member, each of which forms an image to be transferred onto the intermediate transfer member;
   a memory that stores a plurality of image forming modes, each of the plurality of image forming modes representing at least an image-forming unit used for image forming from among the plurality of image-forming units;
   a contact controller that controls a status of contact between the plurality of image-forming units and the intermediate transfer member on the basis of an image forming mode selected from among the plurality of image forming modes, so that an image-forming unit used for image forming represented in the selected image forming mode is contacted with the intermediate transfer member, and another image-forming unit is moved away from the intermediate transfer member; and
   an image-quality adjusting unit that adjusts, if the status of contact is changed by the contact controller, an image quality of an image that is to be transferred onto the intermediate transfer member from the image-forming unit that is in contact with the intermediate transfer member.

2. The image-forming apparatus according to claim 1, wherein when bringing the image-forming unit into contact with the intermediate transfer member, the contact controller controls the status of contact so that a pressure having a level selected from among a plurality of levels is generated between the image-forming unit and the intermediate transfer member.

3. The image-forming apparatus according to claim 1, wherein the image-quality adjusting unit adjusts the image quality if an image-forming unit exists that is newly brought into contact with the intermediate transfer member.

4. The image-forming apparatus according to claim 1, wherein the image-quality adjusting unit does not adjust the image quality if an image-forming unit does not exist that is newly brought into contact with the intermediate transfer member and an image-forming unit exists that is newly separated from the intermediate transfer member.

5. The image-forming apparatus according to claim 1, wherein the image-quality adjusting unit adjusts an image quality with respect to only an image-forming unit that is newly brought into contact with the intermediate transfer member.

6. The image-forming apparatus according to claim 1, wherein the image-quality adjusting unit adjusts an image quality with respect to an image-forming unit whose status of contact has been changed, and another image-forming unit that is arranged adjacent to the image-forming unit.

7. The image-forming apparatus according to claim 1, wherein the image-quality adjusting unit, when adjusting the image quality, adjusts a density of the image that is to be transferred onto the intermediate transfer member with respect to an image-forming unit that is newly brought into contact with the intermediate transfer member, and another image-forming unit that is arranged adjacent to the image-forming unit and that is arranged upstream in a direction of movement of the intermediate transfer member relative to the image-forming unit.

8. The image-forming apparatus according to claim 1, wherein if a plurality of image-forming units contact the intermediate transfer member, the image-quality adjusting unit adjusts, when adjusting the image quality, a relative position gap of a first image that is to be transferred onto the intermediate transfer member from a first image-forming unit of the plurality of image-forming units, with respect to a second image that is to be transferred onto the intermediate transfer member from a second image-forming unit that differs from the first image-forming unit, so that the position gap is reduced.

9. The image-forming apparatus according to claim 1, wherein:
   if all of the image-forming units used for image forming represented in the selected image forming mode satisfy a predetermined condition in which an image quality adjustment is not executed, the image-quality adjusting unit does not adjust the image quality with respect to all of the plurality of image-forming units, and
   in another case, the image-quality adjusting unit adjusts the image quality with respect to all of the image-forming units that are in contact with the inter mediate transfer member.

10. An image-forming apparatus comprising:
an intermediate transfer member on which an image is transferred;
a plurality of image-forming units arranged along the intermediate transfer member, each of which forms an image to be transferred onto the intermediate transfer member;
a plurality of transferring unit that transfers the image formed by the corresponding image-forming unit, onto the intermediate transfer member;
a memory that stores a plurality of modes, each of the plurality of modes representing electric fields for transfer respectively, the electric fields for transfer acting on the intermediate transfer member from each of the plurality of transferring units;
a transfer controller that controls an electric field for transfer on the basis of a mode selected from among the plurality of modes; and
an image-quality adjusting unit that adjusts, if the selected mode is changed, an image quality of an image that is to be transferred onto the intermediate transfer member from the image forming-unit that is in contact with the intermediate transfer member.

\* \* \* \* \*